US008544063B2

(12) United States Patent  
Watanabe

(10) Patent No.: US 8,544,063 B2  
(45) Date of Patent: Sep. 24, 2013

(54) NETWORK SECURITY APPARATUS, NETWORK SECURITY CONTROL METHOD AND NETWORK SECURITY SYSTEM

(75) Inventor: Naotoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1136 days.

(21) Appl. No.: 11/341,312

(22) Filed: Jan. 27, 2006

(65) Prior Publication Data

US 2007/0074272 A1 Mar. 29, 2007

(30) Foreign Application Priority Data

Sep. 29, 2005 (JP) ................................. 2005-283238

(51) Int. Cl.
*G06F 21/00* (2013.01)

(52) U.S. Cl.
USPC ........ 726/3; 726/22; 726/23; 726/24; 726/25; 713/187; 713/188; 713/193; 713/194; 713/150; 713/151; 713/152; 713/153; 709/225; 709/229

(58) Field of Classification Search
USPC ............... 379/111, 114, 37, 39, 44; 455/403, 455/410, 411, 418, 419; 726/2, 3, 22–25; 713/187–188, 193–194; 709/223–227
See application file for complete search history.

(56) References Cited

U.S. PATENT DOCUMENTS

| | | | |
|---|---|---|---|
| 6,243,756 B1 * | 6/2001 | Whitmire et al. ............. | 709/232 |
| 6,453,345 B2 * | 9/2002 | Trcka et al. .................... | 709/224 |
| 7,418,490 B1 * | 8/2008 | Zhang et al. .................. | 709/223 |
| 7,486,782 B1 * | 2/2009 | Roos ........................ | 379/106.03 |
| 7,788,718 B1 * | 8/2010 | Fei et al. ......................... | 726/22 |
| 2004/0215975 A1 * | 10/2004 | Dudfield et al. .............. | 713/201 |
| 2006/0085857 A1 * | 4/2006 | Omote et al. ................... | 726/24 |
| 2006/0173992 A1 * | 8/2006 | Weber et al. .................. | 709/224 |
| 2008/0098476 A1 * | 4/2008 | Syversen ........................ | 726/23 |
| 2010/0031093 A1 * | 2/2010 | Sun et al. ........................ | 714/45 |

FOREIGN PATENT DOCUMENTS

| JP | 2004-229091 | 8/2004 |
|---|---|---|
| JP | 2004-312064 | 11/2004 |
| JP | 2004-312083 | 11/2004 |

OTHER PUBLICATIONS

Notice of Rejection dated Jan. 26, 2010, from the corresponding Japanese Application.
Youta Hiraishi, et al. "A Study of Detecting DoS Attack by Using Automatically Generated Traffic Patterns" IEICE Technical Report, The Institute of Electronics, Information and Communication Engineers, vol. 104, No. 277, pp. 13-18, Aug. 27, 2004.

* cited by examiner

*Primary Examiner* — Morshead Mehedi
*Assistant Examiner* — Josnel Jeudy
(74) *Attorney, Agent, or Firm* — Katten Muchin Rosenman LLP

(57) ABSTRACT

The present invention provides a network security apparatus for monitoring telecommunication information flowing through a network and carrying out detection of, and/or protection from, an illegitimate intrusion to the network, comprising: an anomaly judgment unit for judging a presence or absence of an abnormality of the telecommunication information based on judgment reference information by using a statistical method; a learning unit for creating the judgment reference information from the telecommunication information; a first port for importing first telecommunication information currently from the network; a second port for importing second telecommunication information accumulated by a telecommunication information accumulation apparatus historically; and a telecommunication information allocation unit for allocating the first and second telecommunication information taken in respectively from the first and second ports to the anomaly judgment unit and the learning unit, wherein the learning unit creates the judgment reference information by learning the first and/or second telecommunication information.

10 Claims, 12 Drawing Sheets

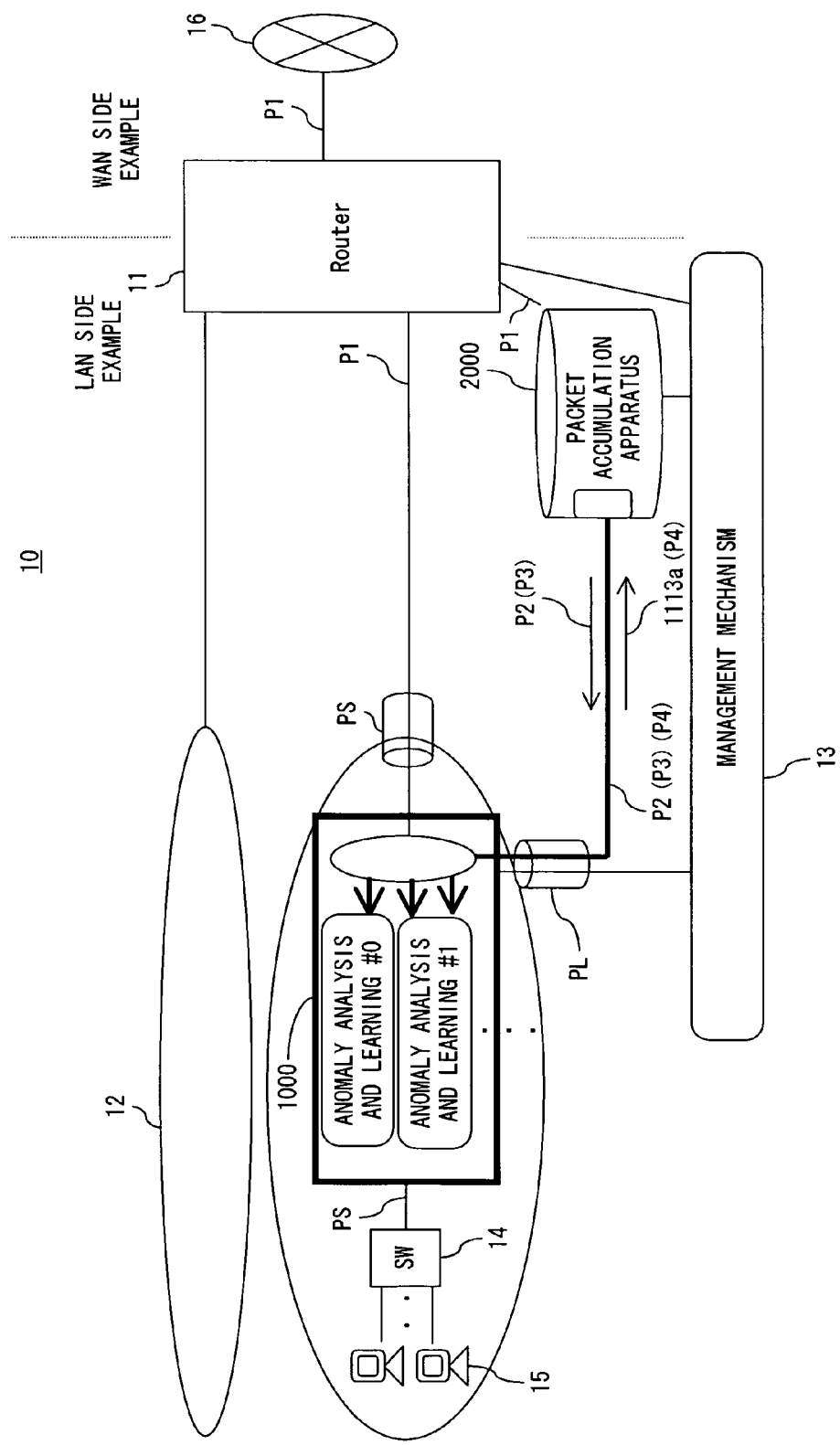
F I G. 1

NETWORK SECURITY APPARATUS, NETWORK SECURITY CONTROL METHOD AND NETWORK SECURITY SYSTEM

BACKGROUND OF THE INVENTION

1. Field of the Invention

The present invention relates to a network security technique and in particular to a technique effectively applicable as a technique for accomplishing a detection of, and protection against, an illegitimate intrusion to a network by using a statistical method.

2. Description of the Related Art

With the progress of an information society based on information and communication networks, ensuring a network security has become increasingly important for preventing an information leakage and avoiding an interruption of service. With the content of threats becoming more complex in the network security, an increasingly common practice is a parallel use of an anomaly analysis method for detecting a phenomenon different from a normality following comprehension of a statistical trend of telecommunication information over a long period of time, together with a pattern matching/signature analysis method for comparison with known ill intended procedures for detection (e.g., a patent document 1).

The anomaly analysis method naturally requires a learning of a flow and trend of telecommunication information in the applicable part over a long period of time. Because of this, an immediate start of a service and operation is not possible after a user introduces a network security apparatus which supports the anomaly analysis method, a trend learning period of one or two weeks being required after introducing and installing the aforementioned apparatus.

Also, an anomaly analysis item might possibly be added after the start of operation due to progress of a network security technique. In such a case, besides the learning required during a continuation of a service, a learning period is also required for an added analysis item from the viewpoint of the analysis item. And a network security is put under a threat during the learning period despite the fact that the network security apparatus actually exists.

In order to make a network security robust under the circumstances of the content of a threat (i.e., an ill intended procedure) to a network becoming highly sophisticated and the speed of change increasing as witnessed in recent years, shortening such a learning period is an important technical challenge.

A method conceived for accomplishing a shorter learning period is a utilization of a packet capture apparatus comprising a replay mode.

The packet capture apparatus is for assisting in a preservation of evidence at the time of a security problem occurrence in a network and an understanding of the security problem by understanding and recording all packets flowing through a specific part of the network. There is also a packet capture apparatus for supporting a replay mode which replays a telecommunication condition, a packet flow and a session from recorded information in order to utilize the understanding result for detecting a threat to the network thereafter.

Also conducted is input of a replay result, as a traffic, to a security apparatus such as IDS (Intrusion Detection System) to perform learning. As such, use of a packet capture apparatus is effective, and a learning period can possibly be shortened by transferring, to a security apparatus which is planned to be introduced, a result of learning by an emulation environment of a network security apparatus, or by a product equipment of the same series with a higher performance than a security apparatus to be introduced, by using information accumulated in the aforementioned packet capture apparatus.

However, an execution environment of a learning process which uses the replay function of a packet capture apparatus exists in a development and support organization in many cases, hence resulting in taking information from the packet capture apparatus having been installed at the site of an introducing customer outside thereof. As a result of this, there is a concern of avoidance of a countermeasure for shortening a learning period by using the above described information accumulated in the packet capture apparatus since a security risk of the introducing customer increases. That is, because packet capture data includes all kinds of data with a mixture of the useful and useless, and of various importance, and therefore a classification of data by the degree of importance is actually very difficult, thus making it impossible to provide a countermeasure for a security risk such as permitting a taking-out of unimportant data only.

Meanwhile, data stored by the packet capture apparatus is historical telecommunication data to begin with, hence not necessarily reflecting the latest telecommunication conditions. It is desirable to try to shorten a learning period by using, as much as possible, the latest telecommunication conditions. Furthermore, in the case of changing an applied security policy along with the introduction of a network security apparatus, the captured data, collected under the conditions of a different historical security policy can not possibly be appropriately used for the learning as is.

As described above, a prescribed period of time is required for learning a trend for a user after the introduction and installation of a network security apparatus in order to apply an anomaly analysis. If the user already possesses data suitable as a learning material which has been accumulated in the packet capture apparatus, a learning period can be shortened. That is, if the historically accumulated information is taken out to the development and support entity of the network security apparatus, a learning period can be shortened by transferring, to a security apparatus which is planned to be introduced, a learning result by an emulation environment of a network security apparatus, or by a product equipment of the same series with a higher performance than a security apparatus to be introduced.

However, an operation such as taking out and managing information with a full attention to a preservation of information levies a great burden on both the user and the support entity, thus reductions of operational procedures and labor become a challenge.

Incidentally, the above noted patent document 1 does not refer to a utilization of traffic data accumulated historically, while it assumes a learning from the traffic data flowing through a network.

In the meantime, another patent document 2 has disclosed a technique for conducting an anomaly type judgment in a packet transfer apparatus which allocates packets to a redundantly configured target as the subject of protection comprising a primary and secondary systems, and transferring a packet possibly having an maliciousness to the secondary system, thereby attempting to protect the target as the subject of protection from a critical damage caused by an intrusion. However, a technical problem of shortening a learning period for an anomaly type judgment, et cetera, is not recognized by the disclosed technique.

Yet another patent document 3 has disclosed as a statistical method for judging abnormality of a network, a technology for realizing abnormality judgment using a k-dimensional vector of which an element is the number of packets normalized for each of k-number of classifications. However, the disclosed technique also does not recognize a technical problem of shortening a learning period for an anomaly type judgment, et cetera.

[Patent document 1] Laid-open Japanese patent application publication No. 2004-312083

[Patent document 2] Laid-open Japanese patent application publication No. 2004-229091

[Patent document 3] Laid-open Japanese patent application publication No. 2004-312064

SUMMARY OF THE INVENTION

A purpose of the present invention is to provide an anomaly type network security technique capable of accomplishing a shortening of a learning period by using telecommunication information without exposing, to a security risk, the aforementioned telecommunication information possessed by a user by historical accumulation.

Another purpose of the present invention is to provide an anomaly type network security technique capable of accomplishing a shortening of a learning period by using the historical telecommunication information possessed by a user without separately requiring specific hardware, software, et cetera.

Yet another purpose of the present invention is to greatly shorten the period required from an introduction to an operation start of a security service without separately requiring specific hardware, software, et cetera, in a learning type network security apparatus.

A first aspect of the present invention is to provide a network security apparatus for monitoring telecommunication information flowing through a network and carrying out detection of, and/or protection from, an illegitimate intrusion to the network, comprising: an anomaly judgment unit for judging a presence or absence of an abnormality of the telecommunication information based on judgment reference information by using a statistical method; a learning unit for creating the judgment reference information from the telecommunication information; a first port for importing current first telecommunication information from the network; a second port for importing second telecommunication information accumulated by a telecommunication information accumulation apparatus historically; and a telecommunication information allocation unit for allocating the first and second telecommunication information imported respectively from the first and second ports to the anomaly judgment unit and the learning unit, wherein the learning unit creates the judgment reference information by learning the first and/or second telecommunication information.

A second aspect of the present invention is to provide a control method for use in a network security apparatus for monitoring telecommunication information flowing through a network and carrying out detection of, and/or protection from, an illegitimate intrusion to the network, comprising: a first process for accumulating second telecommunication information which flowed through the network in the historical; a second process for inputting first telecommunication information currently flowing through the network and the second telecommunication information in parallel; and a third process for learning, from the first and/or second telecommunication information, judgment reference information used for an abnormality judgment which judges a presence or absence of an abnormality of the first telecommunication information by using a statistical method.

A third aspect of the present invention is to provide a network security system, including: a network security apparatus comprising a first port, being connected to a network as the subject of monitoring, for importing first telecommunication information currently flowing through the network, a second port for importing second telecommunication information of the network in the historical which is accumulated in a telecommunication information accumulation apparatus, and a learning unit for learning judgment reference information used for an abnormality judgment which judges a presence or absence of an abnormality of the telecommunication information by using a statistical method; and a replay rate control apparatus, existing between the network security apparatus and the telecommunication information accumulation apparatus, for controlling a replay rate of the second telecommunication information from the telecommunication information accumulation apparatus to the network security apparatus.

The above described present invention is configured to such that the network security apparatus has a learning port (i.e., the second port) and to equip a function for learning by importing the first telecommunication information (i.e., the current information) received in real time by the first port which provides a usual service and also the second telecommunication information from the historical from a telecommunication information accumulation apparatus, such as a log server, packet capture apparatus, et cetera, by way of the learning port, thereby shortening a learning time in order to build judgment reference information used for an anomaly judgment, et cetera, in the abnormality judgment unit and also making it possible to reflect a learning result of the latest first telecommunication information in the judgment reference information.

Since the historical second telecommunication information is imported, for learning, from a telecommunication information accumulation apparatus such as a log server/a packet capture apparatus existing at a customer site by utilizing a learning function comprised by a network security apparatus also installed at the customer site, specific hardware or software for shortening a learning period is not necessary. Moreover, it is not necessary to take the historical second telecommunication information from a telecommunication information accumulation apparatus installed at the customer site.

The learning port may be physically equipped individually in the same way as a common service-use port (e.g., a WAN/LAN port), or logically multi-functioned as a management-use port by using a technology such as a VLAN (virtual LAN), et cetera. This configuration eliminates a necessity of equipping a specific learning port, or wasting a learning port by allocating a service port, thereby enabling a reduced number of required ports in the network security apparatus. In other words, even a network security apparatus with the smaller number of ports accomplishes a shortening of a learning period by utilizing the learning port.

A telecommunication information accumulation apparatus such as a log server/packet capture apparatus is usually located differently from an introduction or installation position of a network security apparatus, in which case telecommunication information flowing through the network security apparatus is extracted.

Here, variables of an anomaly analysis in an anomaly judgment, et cetera, are categorized into the time sensitive and non-sensitive, and the information which is time sensitive and also imported from the learning port is processed for conforming to a replay rate of a later described historical telecommunication information, followed by merging with information of variables of the current telecommunication information.

That is, the variables for analysis in the anomaly judgment, et cetera, are largely categorized into time non-sensitive items (i.e., time independent items) and time sensitive items (i.e., time dependent items).

The time non-sensitive items (i.e., time independent items) are items used for performing a statistical correlation analysis not including an elapsed time, such as a probability of occurring value of a specific field of the telecommunication information, a probability of various state transitions, or a packet size distribution and data volume per session. In this case, if it is desired that the number of samples of packets/sessions increase, the historical telecommunication information can be handled simply by separation in the same way as the current telecommunication information.

The items dependent on time (i.e., time dependent items) are items requiring a time sensitive and those of time correlations requiring a time series analysis, such as the number of packets, or sessions, et cetera, per unit of time, and various frequencies (e.g., a frequency of accesses per addressee or transmitter, a frequency of usages per service, usage time bands, and an extremely high or low frequency of accesses), et cetera. The historical telecommunication information was not taken at the current clock time and a replay speed is not the same as a real time processing speed and therefore it is necessary to separate it from the current information which is handled based on the actual clock time.

As for the time dependent items, it is necessary to hand them over to a statistical analysis unit within the learning unit after inputting the historical clock time information and converting it to a real time processing speed.

In order to enable the network security apparatus to process the above described time sensitive items, the telecommunication information accumulation apparatus such as a log server/packet capture apparatus comprises the function of notifying the aforementioned network security apparatus of clock time information and a replay rate (i.e., a rate of progressing time of processing for the historical second telecommunication information to the actual passage of time) relating to the accumulated historical second telecommunication information.

And the network security apparatus comprises the functions of changing a resource allocated to processing the historical second telecommunication information depending on the processing load of the current first telecommunication information and notifying the log server/packet capture apparatus of the change content. On the other hand, the log server/packet capture apparatus have the function of changing the replay rate of the historical second telecommunication information, following receiving the aforementioned notification.

As such, a control of allocating a resource to a learning of the historical second telecommunication information when a volume of the current first telecommunication information is small enables a shortening of a learning time for learning the historical second telecommunication information without influencing the usual service.

In the case of changing security policies along with the introduction of a network security apparatus, the historical second telecommunication information is imported after applying the latest security policy thereto by applying a post-change filtering rule to the learning port. This makes it possible to build up judgment reference information enabling an anomaly judgment effective to the current first telecommunication information which is processed by the current security policy as a result of learning the historical second telecommunication information.

BRIEF DESCRIPTION OF THE DRAWINGS

FIG. 1 is a conceptual diagram exemplifying a configuration of a network security system according to an embodiment of the present invention;

DESCRIPTION OF THE PREFERRED EMBODIMENTS

Figure 2:
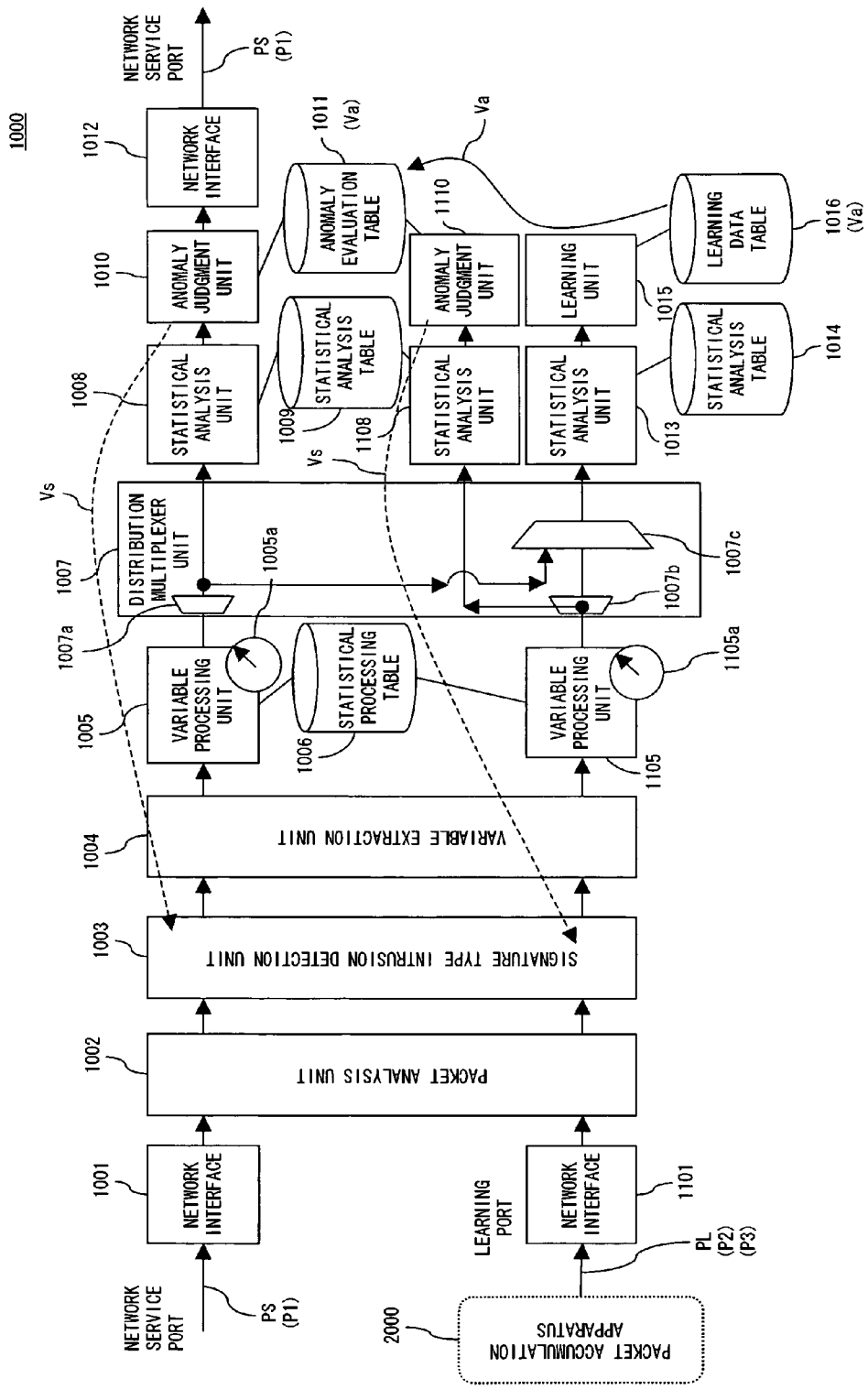
FIG. 2 is a block diagram exemplifying a configuration of a network security apparatus according to an embodiment of the present invention.

The following is a detailed description of the preferred embodiment of the present invention while referring to the accompanying drawings.

FIG. 1 is a conceptual diagram exemplifying a configuration of a network security system according to an embodiment of the present invention.

The network security system 10 according to the present embodiment includes a router 11, a LAN (Local Area Network) 12, a management mechanism 13, a switch 14 and an information processing apparatus 15; and a network security apparatus 1000 and a packet accumulation apparatus 2000.

The router 11 is a path control apparatus for connecting the LAN 12 to an external network 16 such as a wide area network (WAN). The LAN 12 is connected by a plurality of information processing apparatuses 15 by way of the switch 14.

In the case of the present embodiment, a later described network security apparatus 1000 intervenes on the connecting border between the information processing apparatus 15 (or the switch 14) and the LAN 12. The network security apparatus 1000 monitors the current packet P1 (i.e., the first telecommunication information) flows which come in from the LAN 12 or external network 16 and input & output to a network service port PS (i.e., a first port), and determines whether or not the aforementioned current packet P1 is illegitimate for detection and blocking of an illegitimate access to the information processing apparatus 15.

In the case of the present embodiment, the network security apparatus 1000 comprises both functions of an anomaly type illegitimate detection for detecting an illegitimate access by a statistical method learning from the current packets P1 input & output in the operational state, and of a signature type illegitimate access detection by a pattern matching, as described later.

The LAN 12 is equipped by the packet accumulation apparatus 2000 which is connected to the router 11 and captures and accumulates all the current packets P1 arriving from the external network 16.

The current packets P1 accumulated by the packet accumulation apparatus 2000 will be output from it as accumulated packets P2 (i.e., the second telecommunication information) on an as required basis in a future.

As described later, the network security apparatus 1000 according to the present embodiment is configured to equip a learning port PL (i.e., the second port) in addition to the network service port PS for inputting and outputting the current packet P1 currently flowing through the LAN 12.

The learning port PL is connected by the packet accumulation apparatus 2000 for inputting the accumulated packet P2 captured and accumulated thereby historically on an as required basis.

That is, in the case of the present embodiment, when a network security apparatus 1000 is introduced to the LAN 12 anew or when an operating specification such as a security policy in the network security apparatus 1000 is updated, the network security apparatus 1000 is capable of learning by using the historically accumulated packets P2 which are input from the packet accumulation apparatus 2000 by way of the learning port PL, in parallel with a learning by using the current packets P1 flowing through the LAN 12.

The management mechanism 13 manages the network security apparatus 1000 and packet accumulation apparatus 2000 installed in the LAN 12.

FIG. 2 is a block diagram exemplifying a configuration of the network security apparatus 1000 according to the present embodiment.

The network security apparatus 1000 according to the present embodiment includes a network interface 1001, a packet analysis unit 1002, a signature type intrusion detection unit 1003, a variable extraction unit 1004, a variable process unit 1005, a statistical processing table 1006, a distribution multiplexer unit 1007, a statistical analysis unit 1008, a statistical analysis table 1009, an anomaly judgment unit 1010 (i.e., abnormality judgment unit), an anomaly evaluation table 1011, a transmission network interface 1012, a statistical analysis unit 1013, a statistical analysis table 1014, a learning unit 1015 (i.e., a learning unit) and a learning data table 1016.

The network interface 1001 and transmission network interface 1012 input and output the current packet P1 currently flowing through the LAN 12 by way of the network service port PS.

The present embodiment is configured to equip a learning port PL in addition to the network service port PS. The learning port PL is housed by a network interface 1101, and imports an accumulated packet P2 from the packet accumulation apparatus 2000.

The packet analysis unit 1002, signature type intrusion detection unit 1003 and variable extraction unit 1004 are commonly used for both the current packet P1 and accumulated packet P2.

And a variable processing unit 1105, statistical analysis unit 1108 and anomaly judgment unit 1110 are comprised corresponding to the above described variable processing unit 1005, statistical analysis unit 1008 and anomaly judgment unit 1010 in order to process the accumulated packet P2 input from the learning port PL in parallel with the current packet P1.

The statistical analysis unit 1013, statistical analysis table 1014, learning unit 1015 and learning data table 1016 all for carrying out a learning processing are used for both the current packet P1 and accumulated packet P2.

The packet analysis unit 1002 carries out processing such as recognition of the current packet P1 and accumulated packet P2 as respective packets, extraction of necessary information from the respective packets, assembly of a session, recognition of upper level protocol data, et cetera.

The signature type intrusion detection unit 1003 comprises a FW (firewall) and a signature type IDS (Intrusion Detection System) and judges a presence or absence of an intrusion by an identity or nonidentity between specific information of a packet intended to pass through and registered illegitimate access pattern information.

The variable extraction unit 1004 extracts, from the current packet P1 and accumulated packet P2, variables required for an anomaly judgment by a later described anomaly judgment unit 1010 and anomaly judgment unit 1110.

The variable processing unit 1005 (also variable processing unit 1105) carries out processing to figure out the number of field value appearances, the number of received packets, the number of session initiations and the number of session state occurrences, all per frequency/unit of time, and furthermore, variables such as a ratio of changes of the aforementioned pieces of information based on the information from the previous stage relating to the current packet P1 (also the accumulated packet P2). Because of this, the variable process unit 1005 (also variable processing unit 1105) comprises a timer 1005a (also a timer 1105a) with a time measurement function.

The distribution multiplexer unit 1007 comprises a branch unit 1007a, a branch unit 1007b and a multiplexer unit 1007c.

The branch unit 1007a identifies variables of the current packet P1 handed over from the variable process unit 1005 at the previous stage and divides the variables into those for the route for performing an anomaly judgment (i.e., from the statistical analysis unit 1008 to the anomaly judgment unit 1010 to the transmission network interface 1012) and the route for figuring out a value of an evaluation parameter by a learning processing (i.e., from the statistical analysis unit 1013 to the learning unit 1015) based on a known evaluation indicator parameter (i.e., "evaluation indicator values and threshold values" Va) (i.e., judgment reference information), or the processing of copying the aforementioned variables and distributing the same to each of the aforementioned routes.

The branch unit 1007b identifies variables of the accumulated packet P2 handed over from the variable processing unit 1105 on the previous stage and sorts the variables to the route for performing an anomaly judgment (i.e., from the statistical analysis unit 1108 to the anomaly judgment unit 1110) and the route for figuring out a value of an evaluation parameter by a learning processing (i.e., from the statistical analysis unit 1013 to the learning unit 1015) based on a known evaluation indicator parameter (i.e., "evaluation indicator values and threshold values" Va) or the processing of copying the aforementioned variables and distributing the same to each of the aforementioned routes.

The multiplexer unit 1007c simply merges the variables of time independent items of the current packet P1 and accumulated packet P2. Meanwhile, as for the variables of time dependent items of the current packets P1 and accumulated packet P2, the multiplexer unit 1007c performs the processing of extracting time information (i.e., clock time and a replay rate), inputting clock time information based on the aforementioned extraction information and converting it to a real time process speed, all in collaboration with the variable extraction unit 1004 and variable processing unit 1005, both at the previous stage, and variable processing unit 1105.

Figure 3:
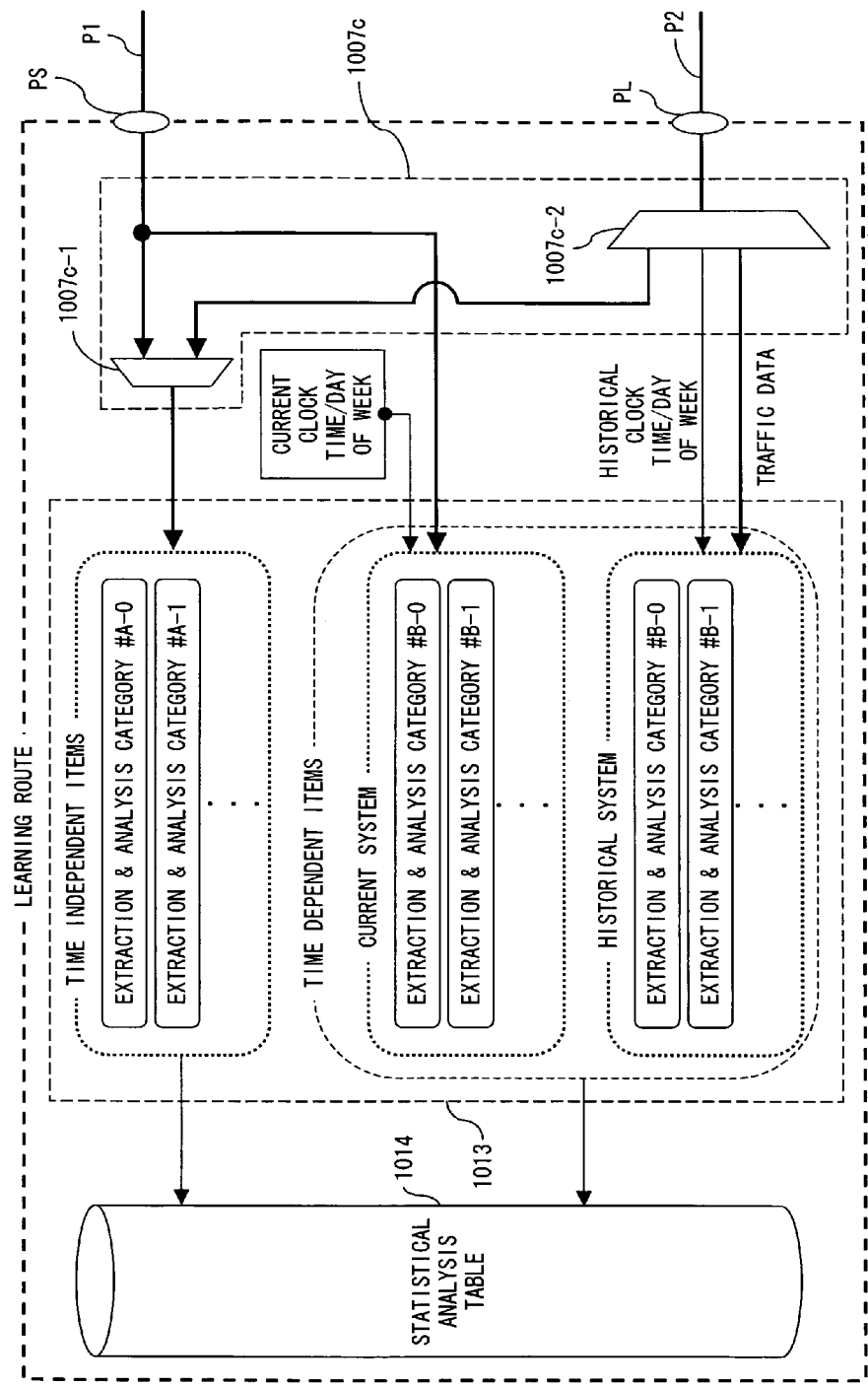
FIG. 3 is a conceptual diagram exemplifying an operation of a learning function of a network security apparatus according to an embodiment of the present invention.
Figure 4:
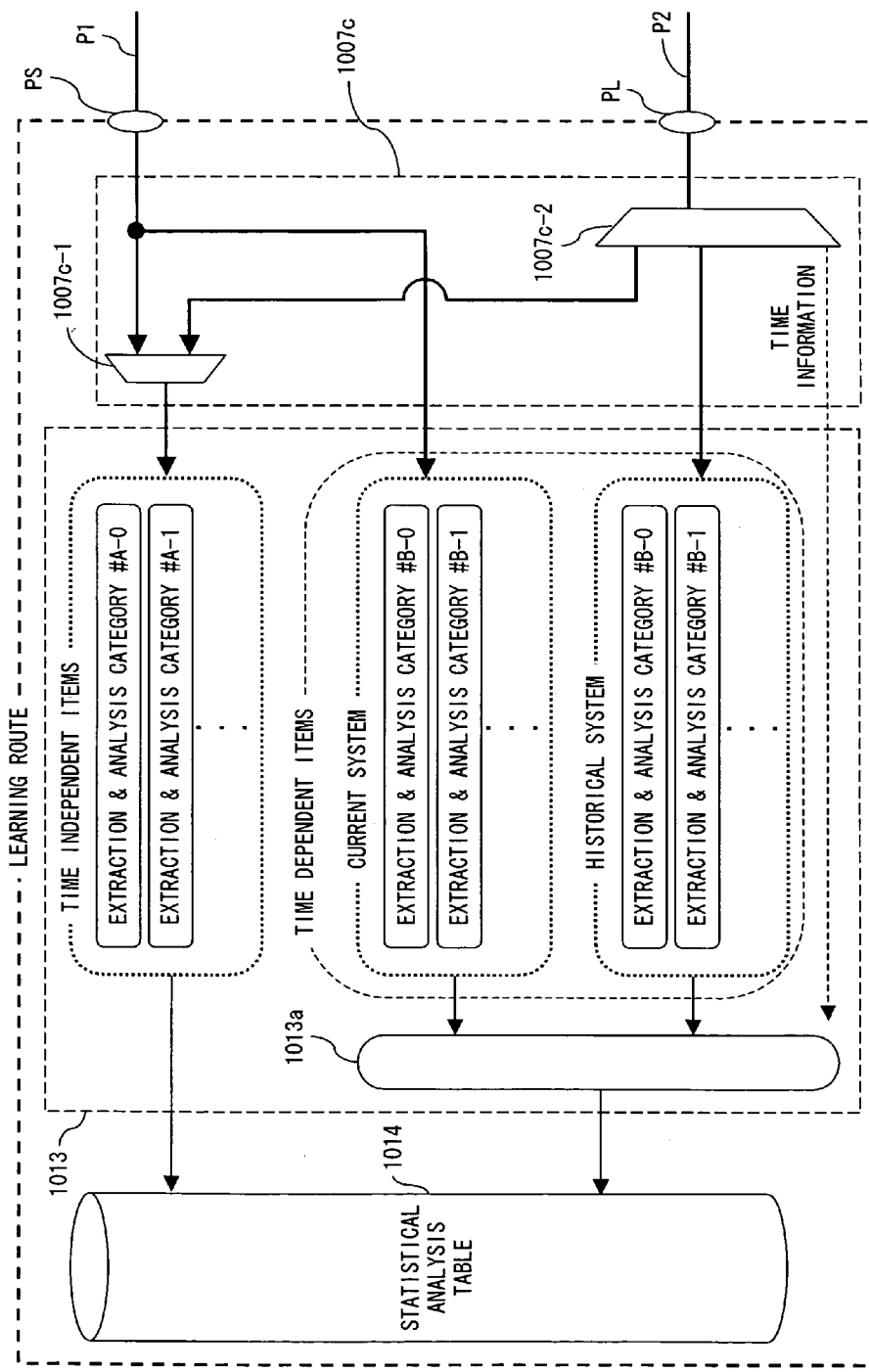
FIG. 4 is a conceptual diagram showing a modified example of an operation of a learning function of a network security apparatus according to an embodiment of the present invention.

The role of the multiplexer unit 1007c in the learning route is described in more detail by referring to FIGS. 3 and 4.

The present embodiment is configured to categorize and identify anomaly analysis items by analyzing correlation. Because of this, the multiplexer unit 1007c has the function of switching a merging/connecting method between the current information (i.e., a current packet P1) and the historical information (i.e., an accumulated packet P2) based on the aforementioned categorization.

Items of analysis correlation are largely sorted into time non-sensitive items (i.e., time independent items) and items dependent on time (i.e., time dependent items).

The time non-sensitive items (i.e., time independent items) include items for performing a statistical correlation analysis not including an elapsed time, such as a probability of occurring value of a specific field of the telecommunication information, a probability of various state transitions, or a packet size distribution and data volume per session. In this case, if it is desired that the number of samples of packets/sessions is increased, the historical telecommunication information can be managed simply by multiplexing in the same way as the current telecommunication information.

Because of this, the multiplexer unit 1007c comprises a traffic data multiplexer unit 1007c-1 for simply multiplexing the time independent items as exemplified by FIG. 3.

However, the items dependent on time (i.e., time dependent items) are items requiring a time sensitivity and those of time correlations requiring a time series analysis, such as the number of packets, or sessions, et cetera, per unit of time, and various frequencies (e.g., a frequency of accesses per addressee or transmitter, a frequency of usages per service, usage time bands, and an extremely high or low frequency of accesses), et cetera. The historical information such as the accumulated packet P2 was not collected at the current clock time and a replay speed is not the same as a real time processing speed of the current packet P1 and therefore it is necessary to separate it from the current information (i.e., the current packet P1) which is handled based on the actual clock time.

Due to this, a time information extraction & separation unit 1007c-2 is equipped in the path for performing the processing for the accumulated packet P2 in the multiplexer unit 1007c, in order to input the historical clock time information (i.e., historical clock time and the day of the week) and hand over traffic data, after converting it to a real time processing speed, to the statistical analysis unit 1013, as exemplified by FIG. 3.

In the example shown by FIG. 3, the time dependent items originated from the current packets P1 and those originated from the accumulated packets P2 are treated as equivalent within the statistical analysis unit 1013.

In the meantime, FIG. 4 exemplifies an operation of the distribution multiplexer unit 1007 in the case of applying a policy of importing real time acquisition information (i.e., the current packet P1) as more important information than the historical information (i.e., the accumulated packet P2).

In this case, the statistical analysis unit 1013 processes until acquiring specified parameters within the network security apparatus 1000 followed by multiplexing by weighting two kinds of time dependent items which are originated from the current packets P1 and accumulated packets P2.

Because of this, statistical analysis unit 1013 is equipped by a current system-historical system information multiplexer unit 1013a for multiplexing by weighting information of two kinds of the time dependent items originated from each of the current packets P1 and accumulated packets P2.

And the current system-historical system information multiplexer unit 1013a multiplexes the current-system time dependent items originated from the current packets P1 and the historical-system time dependent items originated from the accumulated packets P2 by such as a weighted convolution method, based on the time information (i.e., the historical clock time and the day of the week) of the accumulated packet P2 handed over from the time information extraction & separation unit 1007c-2.

The statistical analysis unit 1008 (or the statistical analysis unit 1108) performs a statistical analysis of indicators necessary for the later stage anomaly judgment unit 1010 (or the anomaly judgment unit 1110) relating to the current packets P1 (or the accumulated packet P2).

The statistical analysis table 1009 (or statistical analysis table 1014) records, at the time of a statistical analysis by the statistical analysis unit 1008 (or statistical analysis unit 1013), statistical values such as the average, variance and anomaly evaluation function value range relating to each of a plurality of variables.

Likewise the statistical analysis unit 1013 on the learning route performs a statistical analysis of indicators required at the later stage learning unit 1015.

The anomaly judgment unit 1010 judges whether or not the value relating to the current packets P1 calculated at the statistical analysis unit 1008 is normal by using the "evaluation indicator values and threshold values" Va.

The anomaly judgment unit 1110 judges whether or not the value relating to the accumulated packets P2 calculated at the statistical analysis unit 1108 is normal by using the "evaluation indicator values and threshold values" Va.

The learning unit 1015 calculates, and stores in the learning data table 1016, the "evaluation indicator values and threshold values" Va for the anomaly method judging whether a packet is normal or abnormal by using the statistical analysis data obtained from the statistical analysis unit 1013 and a method such as a regression analysis.

The "evaluation indicator values and threshold values" Va stored in the learning data table 1016 as a learning result is reflected in "evaluation indicator values and threshold values" Va of the anomaly evaluation table 1011 at opportune times for use by the anomaly judgment unit 1010 monitoring a current packet P1.

Figure 5:
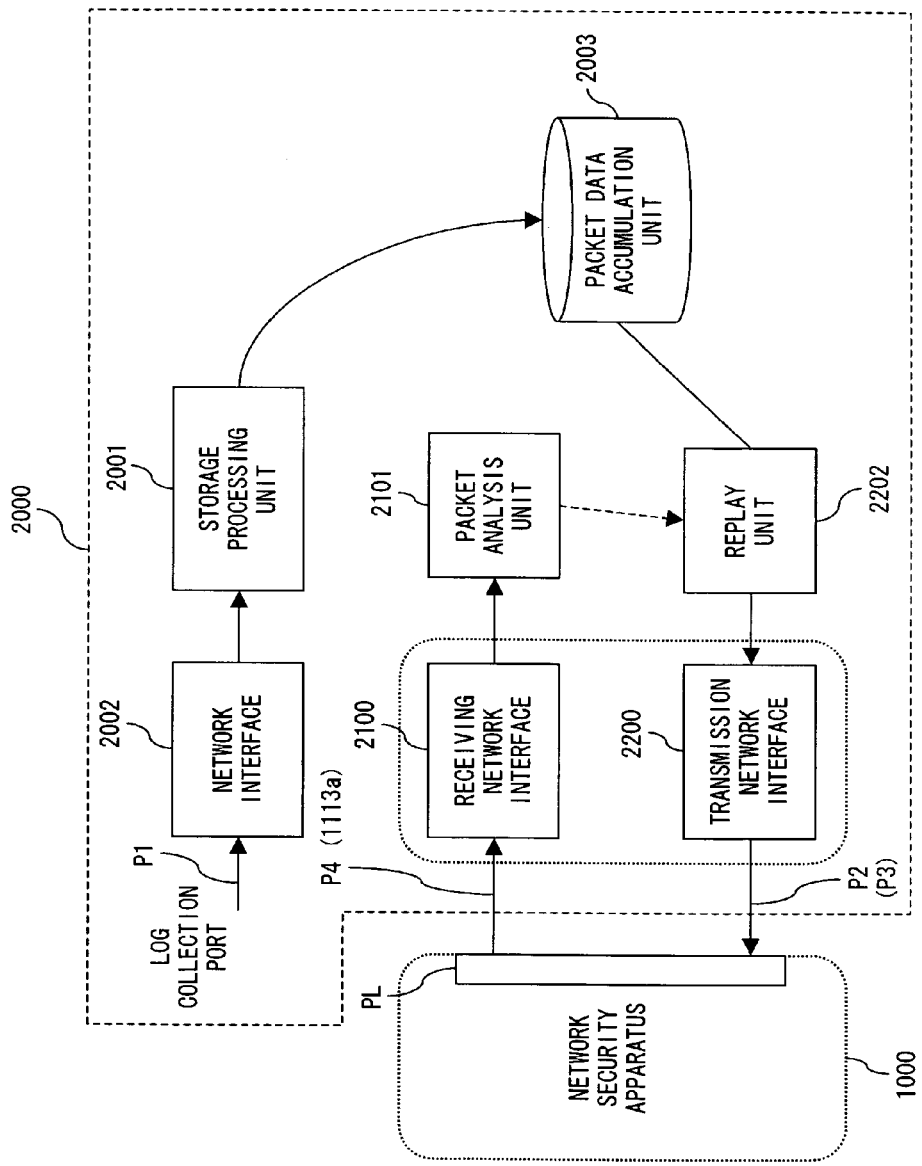
FIG. 5 is a block diagram exemplifying a configuration of a packet accumulation apparatus according to an embodiment of the present invention.

FIG. 5 is a block diagram exemplifying a configuration of the packet accumulation apparatus 2000 according to the present embodiment. The packet accumulation apparatus 2000 includes a network interface 2002, a storage processing unit 2001, a packet data accumulation unit 2003, a replay unit 2202, a receiving network interface 2100, a packet analysis unit 2101, and a transmission network interface 2200.

And the packet accumulation apparatus 2000 captures, by way of the network interface 2002, the telecommunication data such as a current packet P1 which is snooped and mirrored at a specific part (i.e., the router 11 on the right side border shown by FIG. 1 in this case) of a network such as the LAN 12 and lets the storage processing unit 2001 perform the processing such as addition of a time stamp and compression, followed by writing, and accumulating, in the packet data accumulation unit 2003 constituted by a predetermined storage medium.

And receives a control packet arriving from the outside by way of the receiving network interface 2100 and lets the packet analysis unit 2101 analyze it. Then, if it is a replay instruction, instructs the replay unit 2202 to it replay at a predefined replay speed and sends the replayed accumulated packet P2 to the learning port PL of the network security apparatus 1000 by way of the transmission network interface 2200.

The following description is of an example of operation of the network security apparatus 1000 according to the present embodiment.

The first description illustrates an operation in the case of processing a current packet P1.

First, receives the current packet P1 arriving at the network service port PS, which is a port for performing an illegitimate intrusion monitoring and protection, by way of the network interface 1001.

Then, the packet analysis unit 1002 recognizes the received current packet P1 as a packet, extracts necessary information, assembles a session and further recognizes upper level protocol data.

Then, the signature type intrusion detection unit 1003 performs a packet filtering and a session blocking/cut-off based on the packet information such as the upper level protocol data.

Then, the variable extraction unit 1004 extracts variables required for an anomaly judgment for a packet which has passed through the signature type intrusion detection unit 1003. Here, the variables overlap with information extracted by the above described packet analysis unit 1002, including various field values/character strings in each layer/protocol data, a packet received, a session start establishment event occurrence/status, et cetera.

Then, the variable process unit 1005 acquires the number of field value appearances/the number of receiving packets/the number of session starts/the number of session state occurrences per unit of time, based on information from the variable extraction unit 1004; and further acquires variables such as the rates of change of the aforementioned data and hands over to the distribution multiplexer unit 1007 along with the variables received from the variable extraction unit 1004 at the previous stage.

The statistical process table 1006 connected to the variable process unit 1005 retains counters, et cetera, for acquiring the above described rates of change.

The distribution multiplexer unit 1007 hands the variables over to a route for carrying out an anomaly judgment (i.e., from the statistical analysis unit 1008 to the anomaly judgment unit 1010 to the transmission network interface 1012) based on a known evaluation indicator parameter and to a route for learning and acquiring an evaluation indicator parameter value (i.e., from the statistical analysis unit 1013 to the learning unit 1015).

The distribution multiplex unit 1007 identifies variables required by each route, allocates the variable information to each route or distributes the same variable information to each route by copying them.

[Processing in the Route which Carries Out an Anomaly Judgment]

The statistical analysis unit 1008 performs a statistical analysis of indicators required by the later stage anomaly judgment unit 1010; and calculates not only each variable received from the distribution multiplexer unit 1007 but also a correlation between a plurality of variables.

The anomaly judgment unit 1010 judges whether the value calculated by the statistical analysis unit 1008 is normal or abnormal according to the "evaluation indicator values and threshold values" retained by the anomaly evaluation table 1011. And if the result of the anomaly judgment shows a normality, transmits the received packet to the transmission network interface 1012. If the judgment shows an abnormality, discards the aforementioned packet and also feeds back the information about the session including this packet to the signature type intrusion detection unit 1003 as illegitimate access pattern information Vs and registers it therewith for discarding the packets which belongs to the same session and follows this packet.

[Processing in the Route which Carries Out a Learning]

The statistical analysis unit 1013, and likewise the statistical analysis unit 1008, performs a statistical analysis of indicators required at the later stage learning unit 1015.

The learning unit 1015 calculates "evaluation indicator values and threshold values" Va for judging a normality or abnormality by using the statistical analysis data and a method such as a regression analysis, and stores it in the learning data table 1016.

[Processing of an Accumulated Packet P2 Input from the Learning Port PL]

The following describes a processing of an accumulated packet P2 input from the network interface 1101 accommodating the learning port PL which is connected to the packet accumulation apparatus 2000.

Note that a configuration may be such as to equip the network interface 1101 accommodating the learning port PL specifically as the learning port PL, or to use one of a spare interface among the network service ports PS in the case of an apparatus supporting a plurality of interfaces.

To an accumulated packet P2 received at the learning port PL, is applied a packet analysis at the packet analysis unit 1002 and an intrusion check by the FW/signature type IDS at the signature type intrusion detection unit 1003 and likewise for a received packet at the network service port PS, followed by extracting variables at the variable extraction unit 1004, multiplexing them with variables of the current packet P1 at the distribution multiplexer unit 1007 and inputting to the routes of the statistical analysis unit 1013 and the learning unit 1015, thereby carrying out a learning.

Also, in parallel with the processing route for the current packet P1 of the network service port PS, the statistical analysis unit 1108 and the anomaly judgment unit 1110 perform anomaly judgments and makes the signature type intrusion detection unit 1003 perform a packet/session filtering for the accumulated packet P2 flows by feeding back the illegitimate access pattern information Vs based on the judgment result. To the accumulated packets P2 input for learning is applied the FW/signature type IDS at the signature type intrusion detection unit 1003 and likewise for the current packet P1, thereby making it possible to learn according to a changed security policy.

The present embodiment is configured to let the variable processing unit 1105 identify variables requiring the processing sensitive to a passage of time such as a frequency/change rate, et cetera, by assuming the case of predetermining a replay rate at the packet accumulation apparatus 2000 at learning by inputting the accumulated packets P2 and changing clocks of the timer 1105a of the variable processing unit 1105 to match with a designated replay rate, thereby acquiring necessary statistical variables.

Figure 6:
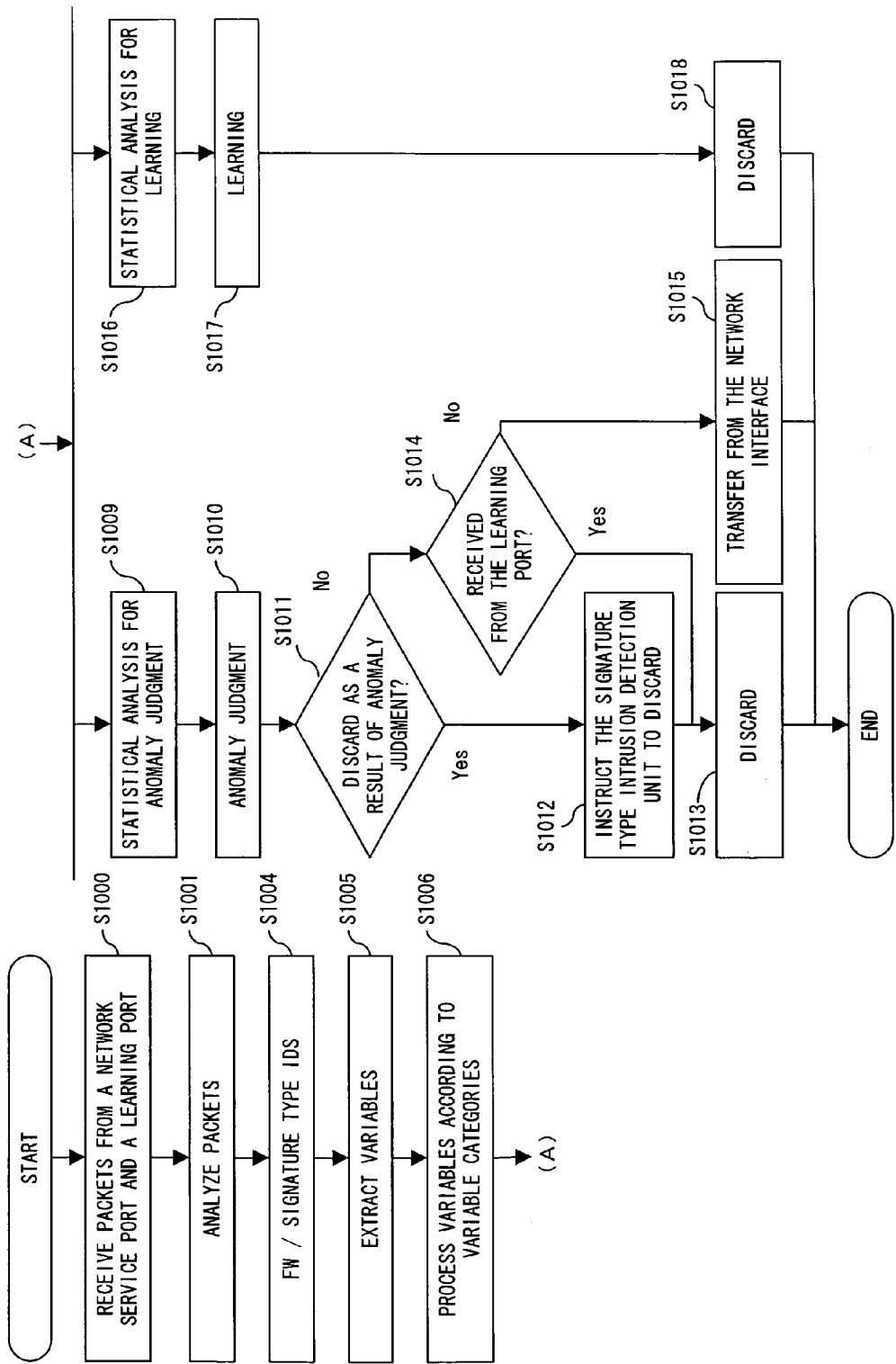
FIG. 6 is a flowchart exemplifying an operation of a network security apparatus according to an embodiment of the present invention.

FIG. 6 is a flow chart showing an operation of the above described network security apparatus 1000.

That is, having received a current packet P1 (or an accumulated packet P2) from the network service port PS (or a learning port PL) (step S1000), the packet analysis unit 1002 analyzes the aforementioned packet (step S1001), the signature type intrusion detection unit 1003 performs an intrusion detection (step S1004), the variable extraction unit 1004 performs a variable extraction (step S1005) and the variable processing unit 1005 (or the variable processing unit 1105) performs a variable processing according to the category of a variable (step S1006).

Then, the statistical analysis unit 1008 (or the statistical analysis unit 1108) carries out a statistical analysis for an anomaly judgment (step S1009) and the anomaly judgment unit 1010 (or the anomaly evaluation table 1011) carries out an anomaly judgment (step S1010).

Then, judges whether the result of the anomaly judgment shows an abnormality or not (step S1010) and, if judged as abnormal, transmits illegitimate access pattern information Vs and also instructs a discarding of the aforementioned packet (step S1012) and discards the current packet P1 (or the accumulated packet P2) (step S1013).

If the judgment in the step S1011 shows a normality, judges whether the aforementioned packet is a current packet P1 or an accumulated packet P2 input from the learning port PL for learning (step S1014) and, if judged as an accumulated packet P2, discards the aforementioned accumulated packet P2 (step S1013).

If judged as a current packet P1 in the step S1014 the aforementioned current packet P1 is transmitted by way of the transmission network interface 1012 (step S1015).

In parallel with the processing of the steps S1009 through S1015, the routes of the statistical analysis unit 1013 and the learning unit 1015 carry out a statistical analysis for learning information (step S1016) and a learning (step S1017) of the current packet P1 and accumulated packet P2, followed by discarding the information after completing the learning (step S1018).

As described above, learning input information of the historical accumulated packet P2 from the packet accumulation apparatus 2000 by way of the learning port PL along with the current packet P1 makes it possible to shorten a learning time and also accomplish a security service based on the latest trends of the current packets P1 in a LAN or an external network 16.

That is, the functions comprised by a network security apparatus 1000 per se are utilized, including an analysis and learning of the current packet P1 and accumulated packet P2, and reflection of a learning result to the equipment parameters. As a result of this, a specific software/tool for an additional analysis or installing the learning result in the network security apparatus 1000 is not required and therefore it is possible to accomplish an introduction and operation management thereof at a reduced cost.

That is, a controllability of the network security apparatus 1000 still largely depends on a vendor. Conventionally, recorded information of a log server/packet capture apparatus needed to be brought to the development site of the vender for replay and analysis and converted to, or correlated to, the control parameters according to a network security apparatus 1000 of a planned introduction by using software of exclusive use.

Although a general purpose product is capable of performing the processing down to a network analysis, a part corresponding to a specification of an individual network security apparatus 1000 depends on the vendor, which may be provided thereby. Even in such a case, however, it is an individual provision from the vendor probably requiring a separate purchase therefrom in many cases.

Comparably with the above described conventional case, the present embodiment enables an application of the analysis function, learning function, et cetera, as is, comprised by the network security apparatus 1000 which is introduced for the network security system 10 of an accumulated packet P2 input from the packet accumulation apparatus 2000 which exists in the aforementioned network security system 10, and therefore no additional software or tool is required at all. Moreover, there is no need to take out the valuable data accumulated in the packet accumulation apparatus 2000 to the outside the organization.

In other words, it is possible to shorten a necessary time between the introduction of a network security apparatus 1000 and the operation start of a security service a great deal, of the learning type network security apparatus 1000 without separately requiring specific hardware, software, et cetera.

The next description is of a modified example of the present embodiment. In the modified example, the following description is of a case of controlling a replay rate of an accumulated packet P2 in a packet accumulation apparatus 2000A from a network security apparatus 1000A.

That is, the network security apparatus 1000A measures processing loads of a statistical analysis, anomaly judgment, and learning, both for the current packets P1 and the accumulated packets P2 input from the learning port PL, and controls a replay rate of the accumulated packets P2 in the packet accumulation apparatus 2000A according to the processing loads.

Figure 7:
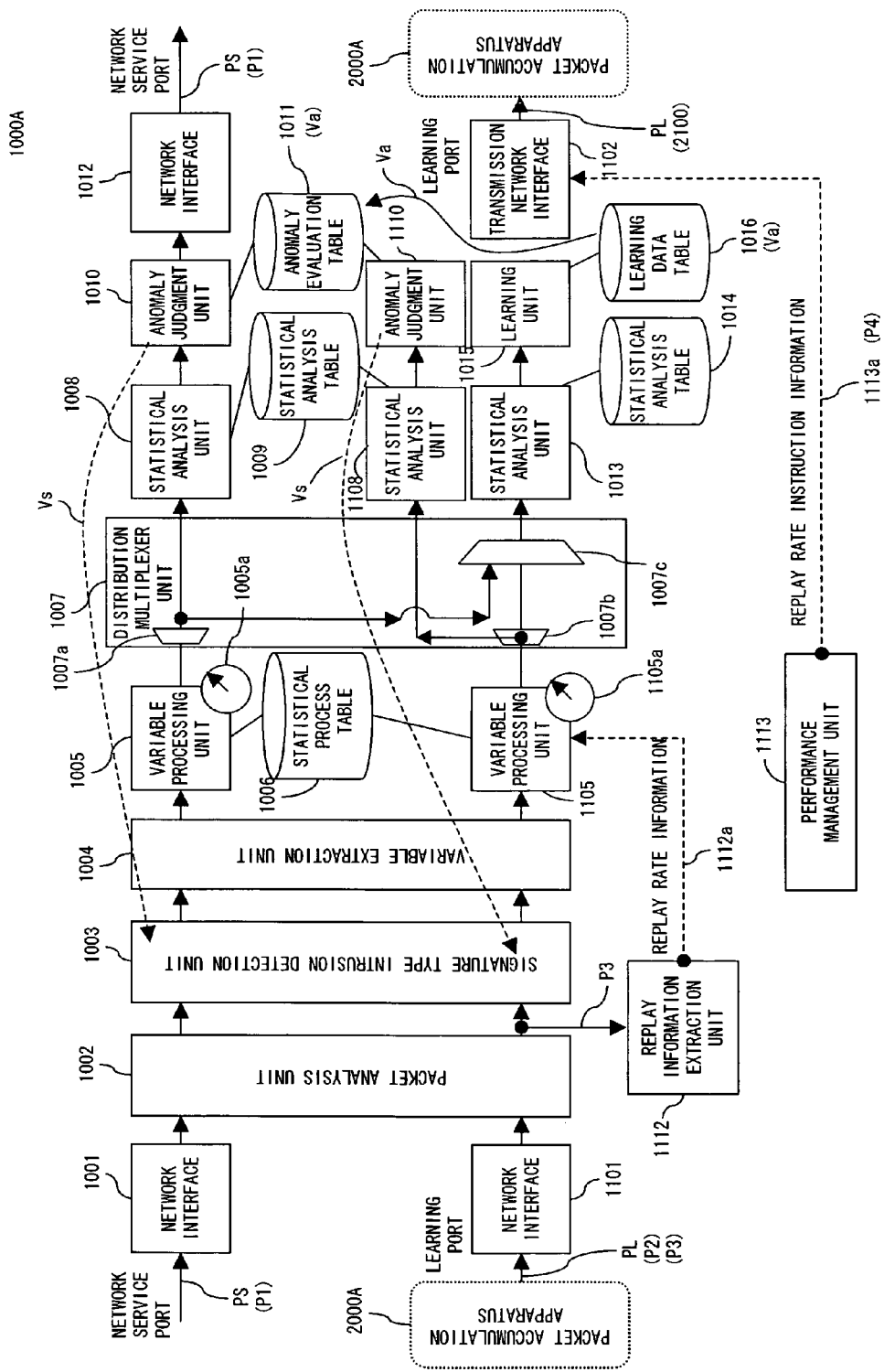
FIG. 7 is a block diagram showing a modified example of a network security apparatus according to an embodiment of the present invention.

FIG. 7 is a block diagram exemplifying a configuration of a network security apparatus 1000A in a modified example.

The fact that a replay information extraction unit 1112 (i.e., a recognition unit), performance management unit 1113 and transmission network interface 1102 are equipped is different from the case of FIG. 2, which is otherwise the same.

The transmission network interface 1102 shares the learning port PL with the network interface 1101. Although FIG. 7 shows two of packet accumulation apparatus 2000A for the convenience of description, there is actually only one.

The performance management unit 1113 measures processing loads of a statistical analysis, anomaly judgment, and learning, both for the current packets P1 and the accumulated packets P2 in the network security apparatus 1000A and outputs a control packet P4 including replay rate instruction information 1113a to the packet accumulation apparatus 2000A by way of the transmission network interface 1102 (i.e., the learning port PL).

If the processing load is high, the replay rate instruction information 1113a instructs the packet accumulation apparatus 2000A for either a replay stop or a lower replay rate, thereby improving the processing performance of the current packet P1.

Conversely, if the processing load is low, instructs the packet accumulation apparatus 2000A for a high replay rate, thereby using the resource of the network security apparatus 1000A effectively for learning the accumulated packets P2.

As the replay rate of the accumulated packets P2 input from the packet accumulation apparatus 2000A changes, it is necessary to adjust a time measurement speed of the above described timer 1105a at the variable processing unit 1105 along with the changing replay rate.

Because of this, the replay information extraction unit 1112 detects a replay rate preliminary notice packet P3 coming in from the packet accumulation apparatus 2000A by being mixed in the accumulated packets P2, reads replay rate information 1112a which is set in the replay rate preliminary notice packet P3 and adjusts the clock (i.e., a time measurement speed) of the timer 1105a at the variable processing unit 1105.

Figure 8:
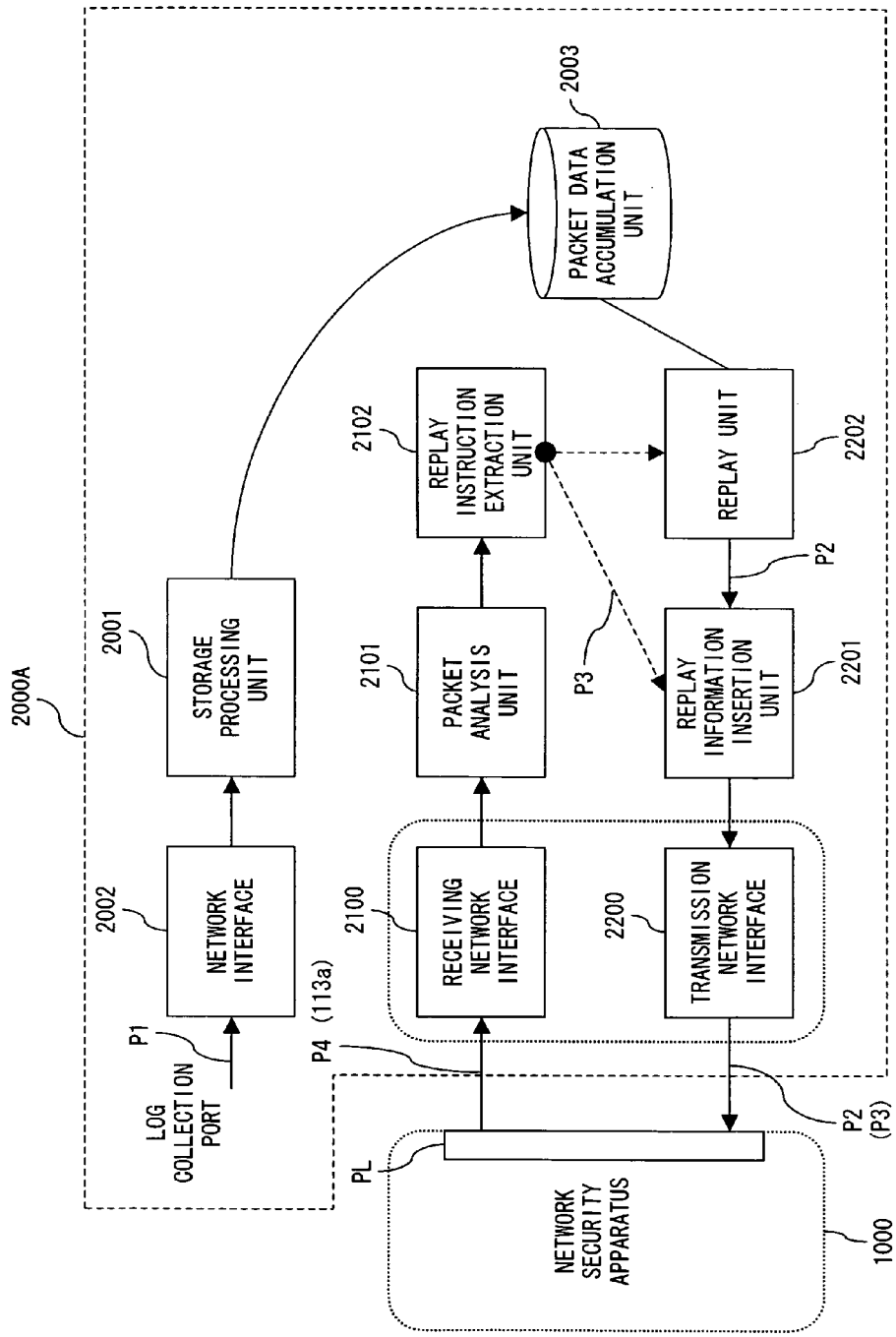
FIG. 8 is a block diagram showing a modified example of a packet accumulation apparatus according to an embodiment of the present invention.

FIG. 8 is a block diagram showing a modified example of a packet accumulation apparatus 2000A according to the present embodiment.

A replay instruction extraction unit 2102 and a replay information insertion unit 2201 have been added which is different from the case of FIG. 5.

That is, the replay instruction extraction unit 2102 adjusts a replay rate of accumulated packets P2 at the replay unit 2202 according to the replay rate instruction information 1113a included in the above described control packet P4 arriving from the performance management unit 1113 comprised by the network security apparatus 1000A; and, furthermore, inputs information of a post-adjustment replay rate to the network security apparatus 1000A by accompanying with the replay rate preliminary notice packet P3 and mixing with the accumulated packets P2 preceding the aforementioned adjustment start, thereby pre-announcing changes in the replay rate.

By so doing, even if the performance management unit 1113 of the network security apparatus 1000A instructs the packet accumulation apparatus 2000 to change the replay rate of the accumulated packet P2, the replay information extraction unit 1112 foresees a change of the replay rate in advance by detecting the replay rate preliminary notice packet P3 and inputs the replay rate information 1112a set therein to the variable processing unit 1105, thereby enabling a synchronization of the operation of the timer 1105a of the variable processing unit 1105 with the changed replay rate of the accumulated packets P2.

Figure 9:
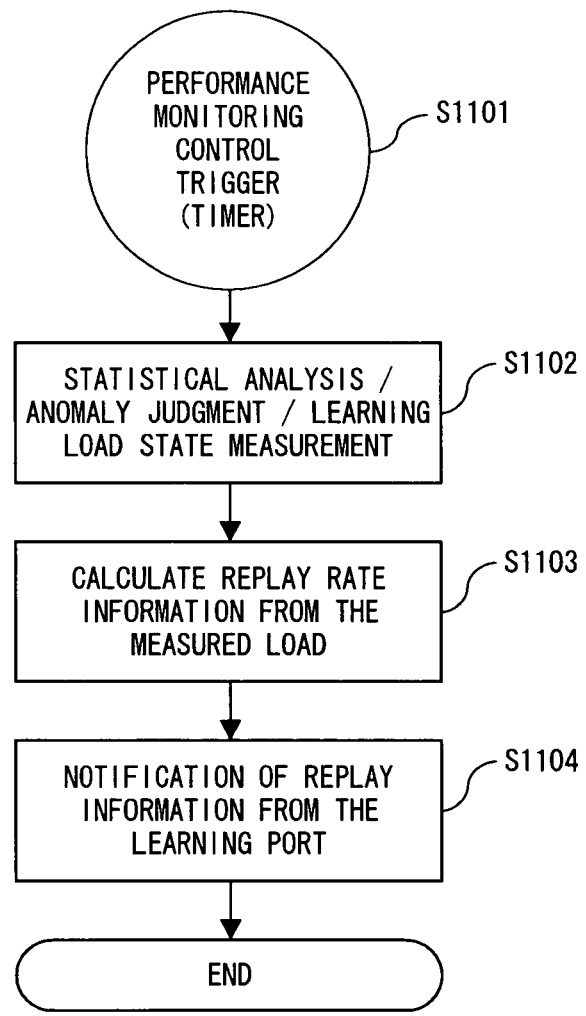
FIG. 9 is a flow chart showing an operation of a modified example of a network security apparatus according to an embodiment of the present invention.

FIG. 9 is a flow chart showing an operation of the performance management unit 1113 of a network security apparatus 1000A.

As a performance monitoring trigger is generated by a timer (not shown herein) (step S1101), measures processing load for the current packets P1 and accumulated packets P2 in the network security apparatus 1000A (step S1102), calculates a replay rate of the accumulated packets P2 at the packet accumulation apparatus 2000A based on the measured load (step S1103) and notifies the packet accumulation apparatus 2000A, by way of the learning port PL, of the calculation result, as the replay rate instruction information 1113a, by overlapping with the control packet P4 (step S1104).

Figure 10:
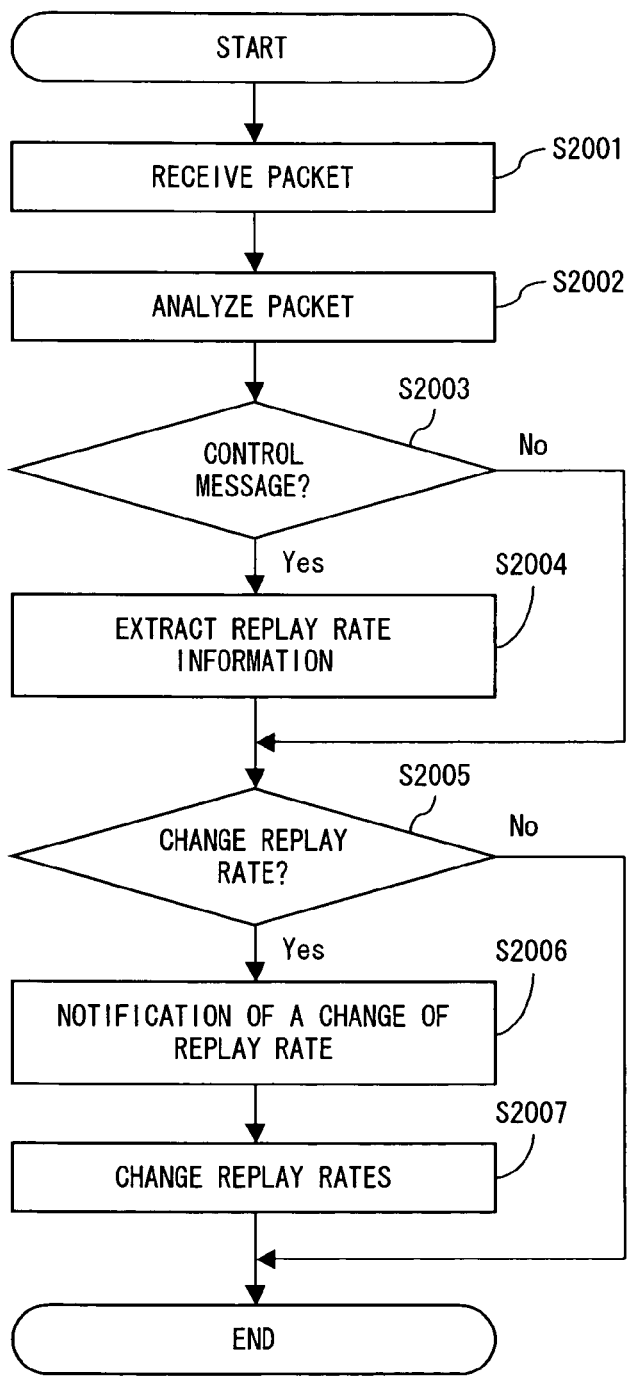
FIG. 10 is a flow chart showing an operation of a modified example of a packet accumulation apparatus according to an embodiment of the present invention.

FIG. 10 is a flow chart exemplifying a change processing of a replay rate in the packet accumulation apparatus 2000A according to the present modified example as a result of receiving the above described notification.

Having received a packet from the network security apparatus 1000A (step S2001), the packet analysis unit 2101 analyzes the aforementioned packet (step S2002) to judge whether or not it is a control packet P4 (step S2003) and, if it is the control packet P4, extracts replay rate instruction information 1113a (step S2004).

Then, judges a necessity of a change, or not, of the replay rate from the content of the replay rate instruction information 1113a (step S2005) and, if judged as a necessity, the replay information insertion unit 2201 first generates a replay rate preliminary notice packet P3 to notify the network security apparatus 1000A of a change of the replay rate (step S2006), followed by instructing the replay unit 2202 to change it to the instructed replay rate (step S2007).

Figure 11:
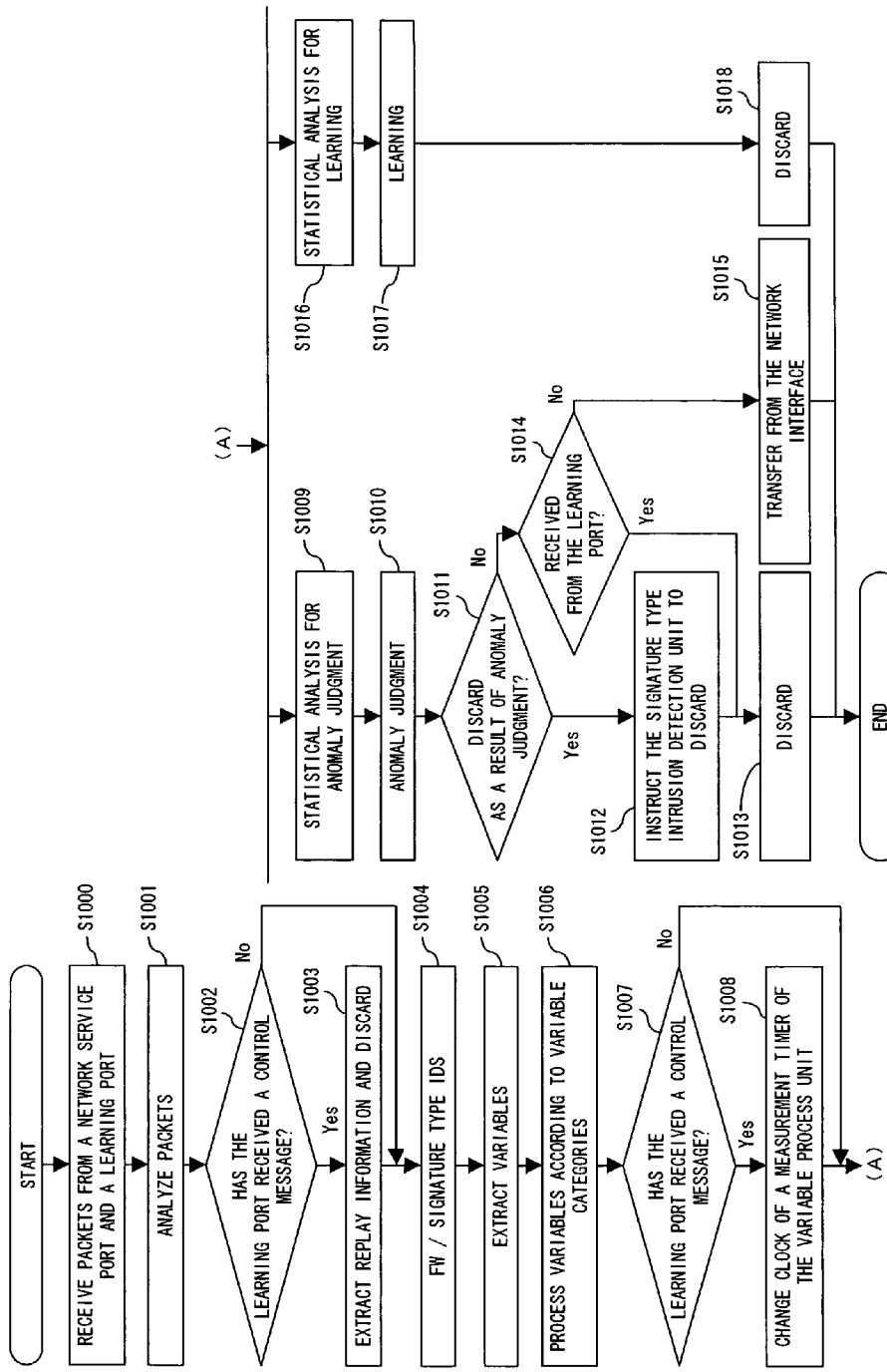
FIG. 11 is a flow chart showing an operation of a modified example of a network security apparatus according to an embodiment of the present invention.

FIG. 11 is a flow chart exemplifying an overall operation of the network security apparatus 1000A of the present modified embodiment.

The steps S1002, S1003, S1007 and S1008 are added which are different from the above described FIG. 6, which is otherwise the same.

That is, the network security apparatus 1000A lets the replay information extraction unit 1112 identify and extract a replay rate preliminary notice packet P3 (steps S1002 and S1003), recognizes a transition to the new replay rate and inputs replay rate information 1112a to the variable processing unit 1105 by matching the new replay rate, thereby changing the clock of the timer 1105a comprised by the variable processing unit 1105 (steps S1007 and S1008).

As described above, the present modified embodiment makes it possible to allocate a process capability for a learning by using the accumulated packets P2 according to the fluctuation of a processing load in the network security apparatus 1000A, e.g., a load of information processing for the current packets P1 is low, hence making it possible to further improve a learning speed. In other words, the availability of the network security apparatus 1000A as an information processing apparatus is improved.

Observing the average network usage rate, it is less than 50% even during business hours and it is no more than 10% during the night and early in the morning. For example, a certain vendor of a packet capture apparatus determines the capacity of a packet capture-use disk apparatus by assuming a network usage rate of 5% on Saturdays and Sundays.

If a common learning type network security apparatus is installed in the LAN 12, the processing load is nearly proportionate with the network usage rate, with most of the resources idle.

Focusing on this point, the present modified embodiment can improve a learning efficiency to further shorten a learning time by allocating a spare resource of the network security apparatus 1000A to learning the accumulated packets P2 input from the packet accumulation apparatus 2000A.

Figure 12:
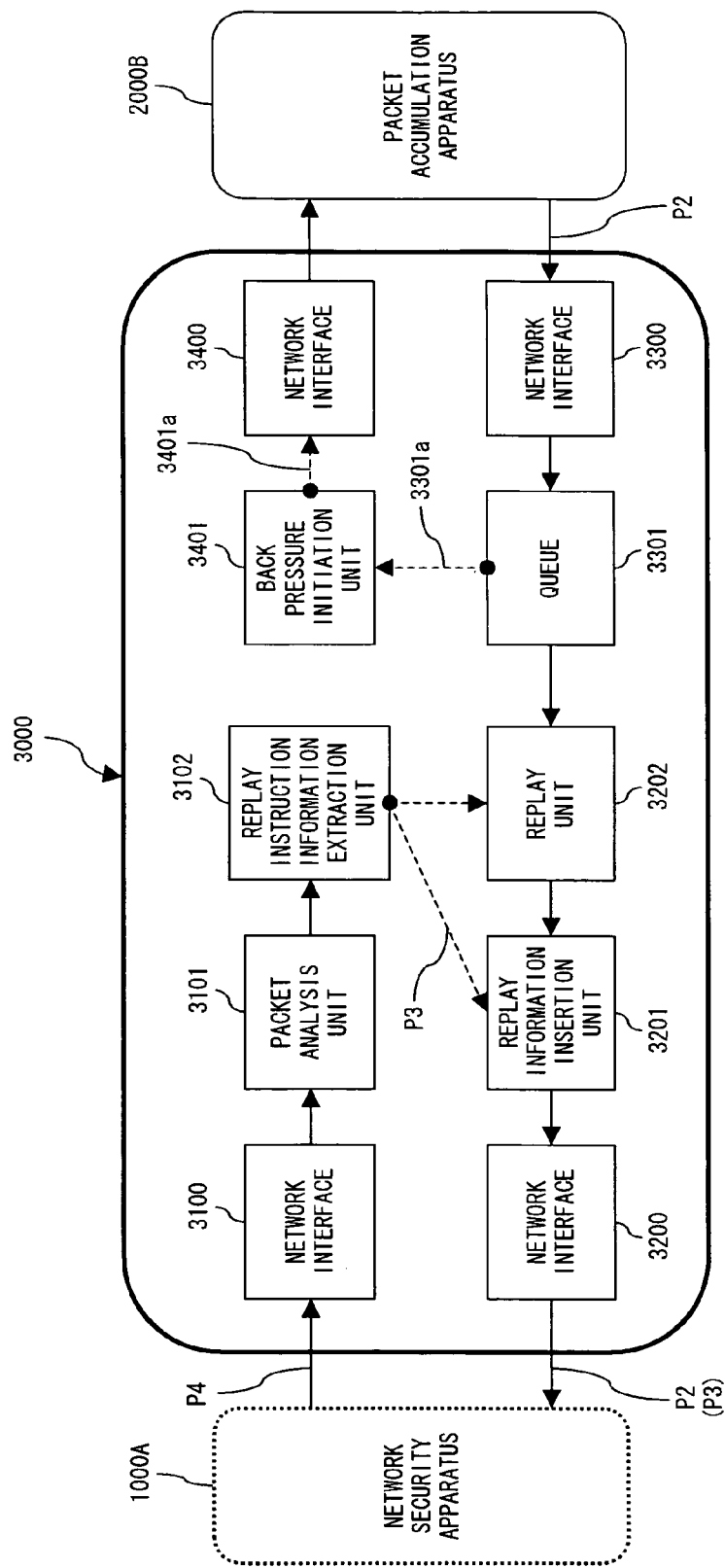
FIG. 12 is a block diagram exemplifying a configuration of a replay input conversion apparatus according to an embodiment of the present invention.

While the above described modified embodiment has exemplified the case of using the packet accumulation apparatus 2000A, shown by FIG. 8, comprising the mechanisms such as a replay instruction extraction unit 2102, and a replay information insertion unit 2201, et cetera, for recognizing an external instruction for changing a replay rate, the following FIG. 12 exemplifies a case of using a common packet accumulation apparatus 2000B as is.

In such a case, it is possible to externally control the replay rate in a replay processing of accumulated packets P2 for the common packet accumulation apparatus 2000B by making a replay input conversion apparatus 3000 (i.e., replay rate conversion unit) as exemplified by FIG. 12 intervene between the existing packet accumulation apparatus 2000B and network security apparatus 1000A.

That is, the replay input conversion apparatus 3000 includes a network interface 3100, a packet analysis unit 3101, a replay instruction information extraction unit 3102, a network interface 3200, a replay information insertion unit 3201, a replay unit 3202, a network interface 3300, a queue 3301, a network interface 3400 and a back pressure initiation unit 3401.

The network interface 3100 and the network interface 3200 are connected to the learning port PL of the network security apparatus 1000A.

The network interface 3300 and the network interface 3400 are connected to the packet accumulation apparatus 2000B by a connection interface such as Ethernet (trademark registered).

An accumulated packet P2 read out of the packet accumulation apparatus 2000B by way of the network interface 3300 is once retained by the queue 3301.

The accumulated packets P2 retained by the queue 3301 are read out by the replay unit 3202 sequentially in a first-in first-out method, a prescribed replay processing is applied therein and then input to the learning port PL of the network security apparatus 1000A via the network interface 3200.

The queue 3301, when it becomes full with the accumulated packets P2, initiates the back pressure initiation unit 3401 by transmitting a back pressure initiation signal 3301a thereto so that the back pressure initiation unit 3401 transmits a back pressure signal 3401a to the packet accumulation apparatus 2000B by way of the network interface 3400 for suppressing transmission of accumulated packets P2 from the packet accumulation apparatus 2000B to the queue 3301.

The back pressure signal 3401a output from the back pressure initiation unit 3401 utilizes a function supported by the standard of the Ethernet specification. Because of this, the packet accumulation apparatus 2000 per se does not need a specific mechanism for controlling a transmission speed of the accumulated packets P2.

Accordingly, a readout speed of the accumulated packets P2 from the packet accumulation apparatus 2000B to the queue 3301 is automatically controlled in accordance with the readout speed of the accumulated packets P2 from the queue 3301 to the replay unit 3202.

A packet coming in from the network security apparatus 1000A is analyzed by the packet analysis unit 3101 and, if it is a control packet P4 for controlling a replay rate, the aforementioned control packet P4 is handed over to the replay instruction information extraction unit 3102.

The replay instruction information extraction unit 3102 instructs the replay unit 3202 of the replay rate of the accumulated packets P2 based on the replay rate instruction information 1113a set in the control packet P4, as well as instructing the replay information insertion unit 3201 to transmit a replay rate preliminary notice packet P3 in order to provide the network security apparatus 1000A with an advanced notice of a change in the replay rate of the accumulated packets P2, prior to the aforementioned instruction.

The network security system configured as shown by FIG. 12 is capable of controlling an input speed (i.e., a replay rate) of the accumulated packets P2 to the learning port PL of the network security apparatus 1000A just by connecting the existing packet accumulation apparatus 2000B to the network security apparatus 1000A by way of the replay input conversion apparatus 3000 without requiring any modification to the packet accumulation apparatus 2000B.

That is, a use of the existing packet accumulation apparatus 2000B as is accomplishes a shorter learning period for a newly introduced network security apparatus 1000A and improvement of availability thereof.

Note that it goes without saying that the present invention can be changed in various ways within the scope thereof instead of being limited by the configurations exemplified by the above described embodiments.

The present invention is capable of accomplishing a shortening of a learning period by using the historical telecommunication information possessed by the user without exposing the aforementioned historical telecommunication information to a security risk.

The present invention is also capable of accomplishing a shortening of a learning period by using the historical telecommunication information possessed by the user without requiring specific hardware or software, et cetera, separately.

The present invention is also capable of accomplishing a shortening of a required period from the introduction of a learning type network security apparatus to the operation start of a security service thereof greatly without requiring specific hardware or software, et cetera, separately.

What is claimed is:

1. A network security apparatus for monitoring telecommunication information flowing through a network and carrying out detection of, and/or protection from, an illegitimate intrusion to the network, comprising:

a first port connected to the network, to import first telecommunication information currently from the network;

a second port connected to a telecommunication information accumulation apparatus, to import second telecommunication information accumulated by the telecommunication information accumulation apparatus historically; and a processor configured to judge a presence or absence of an abnormality of the first and the second telecommunication information based on judgment reference information by using a statistical method, to create and update the judgment reference information by learning the presence or absence of the abnormality, to decrease a replay rate, which represents an input speed of the second telecommunication information in the telecommunication information accumulation apparatus to the second port, when a magnitude of a processing load at the network security apparatus is high, to increase the replay rate for allocating a spare resource of the network security apparatus to learning the second telecommunication information when the magnitude of the processing load is low to synchronize the operation of the second telecommunication information with the changed replay rate, to allocate the first and second telecommunication information taken in respectively from the first and second ports to the processor, to categorize the first and second telecommunication information into a time independent item and a time dependent item, simply to multiplex the time independent item included in the first and second telecommunication information, and to make the time dependent item of the second telecommunication information conform to a processing speed of the time dependent item of the first telecommunication information based on timing information at the time of picking up the second telecommunication information.

2. The network security apparatus according to claim 1, wherein the processor is further configured to recognize third telecommunication information which is mixed in the second telecommunication information coming in from the telecommunication information accumulation apparatus and includes information indicating the replay rate of the second telecommunication information therein.

3. The network security apparatus according to claim 1, wherein the second port is logically multi-functioned with an apparatus management port to manage externally the aforementioned network security apparatus.

4. The network security apparatus according to claim 1, wherein the processor is further configured to intervene between the telecommunication information accumulation apparatus and the network security apparatus, to input the second telecommunication information to the second port at the replay rate instructed by the network security apparatus, and to make third telecommunication information, which indicates the replay rate of the second telecommunication information in the telecommunication information accumulation apparatus, mixed in the second telecommunication information.

5. The network security apparatus according to claim 1, wherein the processor is further configured to carry out a detection and protection processing for the second telecommunication information based on the same security policy as the first telecommunication information, and to allocate the first and second telecommunication information taken in respectively from the first and second ports to the processor.

6. A control method for use in a network security apparatus for monitoring telecommunication information flowing through a network and carrying out detection of, and/or protection from, an illegitimate intrusion to the network, comprising:

accumulating second telecommunication information which flowed through the network historically in a telecommunication information accumulation apparatus;

inputting first telecommunication information currently flowing through the network from a first port and the second telecommunication information from a second port in parallel;

judging a presence or absence of an abnormality of the first and the second telecommunication information based on judgment reference information;

creating and updating the judgment reference information by learning an illegitimate intrusion pattern judged by the judging;

decreasing a replay rate, which represents an input speed of the second telecommunication information in the telecommunication information accumulation apparatus to the second port, when a magnitude of a processing load at the network security apparatus is high;

increasing the replay rate for allocating a spare resource of the network security apparatus to learning the second telecommunication information when the magnitude of the processing load is low; and synchronizing the operation of the second telecommunication information with the changed replay rate, wherein the network security apparatus includes the first port connected to the network, and the second port connected to the telecommunication information accumulation apparatus, and wherein the control method further comprises:

allocating the first and second telecommunication information taken in respectively from the first and second ports, and categorizing the first and second telecommunication information into a time independent item and a time dependent item, simply to multiplex the time independent item included in the first and second telecommunication information, and to make the time dependent item of the second telecommunication information conform to a processing speed of the time dependent item of the first telecommunication information based on timing information at the time of picking up the second telecommunication information.

7. The control method for use in a network security apparatus according to claim 6, wherein the inputting performs a detection and protection processing for the second telecommunication information based on the same security policy as the first telecommunication information.

8. The control method for use in a network security apparatus according to claim 7, wherein the creating and updating categorize the first and second telecommunication information into a time independent item and a time dependent item, simply multiplexes the time independent item included in the first and second telecommunication information, and makes the time dependent item of the second telecommunication information conform to a processing speed of the time dependent item of the first telecommunication information based on timing information at the time of picking up the second telecommunication information.

9. A network security system, including:

a network security apparatus comprising:

a first port connected to a network as the subject of monitoring, to import first telecommunication information currently flowing through the network;

a second port to import second telecommunication information of the network historically which is accumulated in a telecommunication information accumulation apparatus;

a processor configured to judge a presence or absence of an abnormality of the first and the second telecommunication information based on judgment reference information by using a statistical method, to create and update the judgment reference information by learning the presence or absence of the abnormality;

to allocate the first and second telecommunication information taken in respectively from the first and second ports to the processor, and to categorize the first and second telecommunication information into a time independent item and a time dependent item, simply to multiplex the time independent item included in the first and second telecommunication information, and to make the time dependent item of the second telecommunication information conform to a processing speed of the time dependent item of the first telecommunication information based on timing information at the time of picking up the second telecommunication information; and a replay rate control apparatus, existing between the network security apparatus and the telecommunication information accumulation apparatus, to decrease a replay rate, which represents an input speed of the second telecommunication information in the telecommunication information accumulation apparatus to the second port, when a magnitude of a processing load at the network security apparatus is high;

to increase the replay rate for allocating a spare resource of the network security apparatus to learning the second telecommunication information when the magnitude of the processing load is low; and to synchronize the operation of the second telecommunication information with the changed replay rate.

10. A method comprising:

using a network monitored by a network security apparatus for monitoring telecommunication information flowing through the network and carrying out detection of, and/or protection from, an illegitimate intrusion to the network, wherein the network security apparatus comprises:

a first port connected to the network, to import first telecommunication information currently from the network;

a second port connected to a telecommunication information accumulation apparatus, to import second telecommunication information accumulated by the telecommunication information accumulation apparatus historically; and a processor configured to judge a presence or absence of an abnormality of the first and the second telecommunication information based on judgment reference information by using a statistical method, to create and update the judgment reference information by learning the presence or absence of the abnormality, to decrease a replay rate, which represents an input speed of the second telecommunication information in the telecommunication information accumulation apparatus to the second port, when a magnitude of a processing load at the network security apparatus is high, to increase the replay rate for allocating a spare resource of the network security apparatus to learning the second telecommunication information when the magnitude of the processing load is low, to synchronize the operation of the second telecommunication information with the changed replay rate, to allocate the first and second telecommunication information taken in respectively from the first and second ports to the processor, and to categorize the first and second telecommunication information into a time independent item and a time dependent item, simply to multiplex the time independent item included in the first and second telecommunication information, and to make the time dependent item of the second telecommunication information conform to a processing speed of the time dependent item of the first telecommunication information based on timing information at the time of picking up the second telecommunication information.

\* \* \* \* \*